United States Patent [19]
Lessmann et al.

[11] 4,291,220
[45] Sep. 22, 1981

[54] METHOD OF WELDING UTILIZING BOTH CONSUMABLE AND NON-CONSUMABLE ELECTRODES

[75] Inventors: Gerald G. Lessmann, Pleasant Hills, Pa.; Ronald P. Simpson, Old Saybrook, Conn.; William J. Reichenecker, Penn Hills; Ronald D. O'Brokta, Kiski Township, Westmoreland County, both of Pa.

[73] Assignee: Westinghouse Electric Corp., Pittsburgh, Pa.

[21] Appl. No.: 102,598

[22] Filed: Dec. 12, 1979

[51] Int. Cl.³ .............................................. B23K 9/16
[52] U.S. Cl. .................................. 219/137 R; 219/74
[58] Field of Search ........................... 219/74, 137 R

[56] References Cited

U.S. PATENT DOCUMENTS

| 1,828,977 | 10/1931 | Miller | 219/137 R |
| 3,171,944 | 3/1965 | Linnander | 219/137 R |
| 3,197,604 | 7/1965 | Turbyville | 219/137 R |
| 3,209,122 | 9/1965 | Johnston | 219/137 R |
| 3,519,780 | 7/1970 | Potapievsky | 219/76.14 |

FOREIGN PATENT DOCUMENTS

| 47-3881 | 3/1972 | Japan | 219/137 R |
| 54-36912 | 11/1979 | Japan | 219/74 |
| 522013 | 8/1976 | U.S.S.R. | 219/137 R |

Primary Examiner—E. A. Goldberg
Attorney, Agent, or Firm—F. J. Baehr, Jr.

[57] ABSTRACT

A method of welding utilizing consumable and non-consumable electrodes blanketed with inert gas to weld with a minimal amount or no preheating.

2 Claims, 2 Drawing Figures

METHOD OF WELDING UTILIZING BOTH CONSUMABLE AND NON-CONSUMABLE ELECTRODES

BACKGROUND OF THE INVENTION

This invention relates to a method of welding and more particularly to a method of welding utilizing both consumable and non-consumable electrodes blanketed with inert gas.

Consumable metallic electrodes shielded by inert gas are often referred to as metal inert gas shielded welding and known in the art by the acronym MIG welding and has been utilized widely in industry for high productivity welds.

Non-consumable electrodes, tungsten inert gas shielded welding is often referred to by its acronym TIG welding. TIG welding has been widely used in industry either with or without filler metal.

Either of these methods of welding may result in poor fusion when the thermal conductivity of the workpiece is high such as when welding copper or aluminum particularly when the joint is not preheated. Patents 3,122,629 and 3,328,556 describe a hot wire process of welding in which a non-consumable electrode forms an arc and filler wire is heated by an electrical current and fed into the arc produced by the non-consumable electrode. Heating the wire electrically provides some additional heat, but not enough to eliminate preheating when welding metals with high thermal conductivity.

SUMMARY OF THE INVENTION

In general, a method of welding when performed in accordance with this invention comprises the steps of producing a first arc between a non-consumable electrode and a workpiece and moving the first arc at a generally uniform rate, producing a second arc between a filler wire and the workpiece adjacent the first arc and moving the second arc at the same general uniform rate, and blanketing the workpiece in the vicinity of the arcs with inert gas.

BRIEF DESCRIPTION OF THE DRAWINGS

The objects and advantages of this invention will become more apparent from reading the following description in connection with the accompanying drawings, in which.

DESCRIPTION OF THE PREFERRED EMBODIMENT

Figure 1:
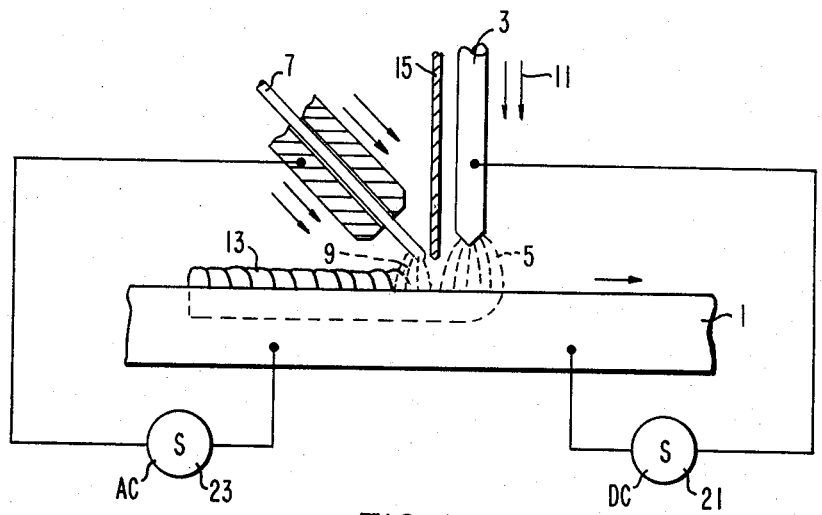
FIG. 1 is a schematic diagram showing the disposition of electrodes utilized in this invention.

Referring now to the drawings in detail, there is shown a workpiece 1, a non-consumable tungsten electrode 3 forming an arc 5 with the workpiece 1 and a consumable metallic electrode 7 made from a material similar to that of the workpiece 1 and forming an arc 9 with the workpiece 1. An inert gas blanket is indicated by the arrows 11 blanketing and vicinity of the arcs. A weld bead 13 is formed as the arcs 5 and 9 move relative to the workpiece 1.

Figure 2:
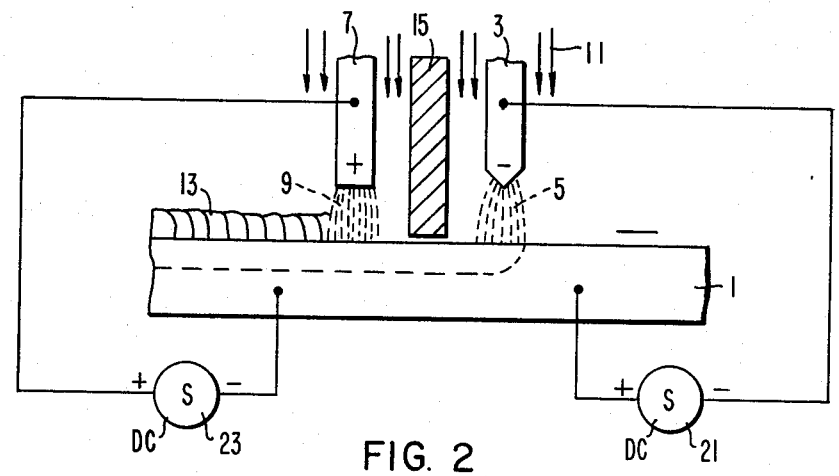
FIG. 2 is a schematic diagram of an alternate embodiment.

Each arc 5 and 9 is controlled by a separate welding machine or power source 21 and 23, respectively, allowing considerable latitude in the power and current and thus the heat input in each arc. Preferably, as shown in FIG. 2, the tungsten electrode 3 is supplied power by a straight polarity DC source 21 so that the polarity of the tungsten electrode 3 is negative. Whereas the consumable electrode 7 is supplied with power from a DC source 23 having a reversed polarity, positive, which advantageously reduces the interaction between the arcs 5 and 9.

As shown in FIG. 1 an AC source may also be utilized to energize the consumable electrode 7 to cut down the interference between the arcs 5 and 9.

As shown in FIGS. 1 and 2, a baffle 15 made of a ceramic or other heat resisting material is placed between the arcs 5 and 9 to prevent interference between the arcs, when they are disposed in close proximity to each other.

The method of welding utilizing the welding equipment set forth hereinbefore comprises the steps of:

establishing and maintaining a first arc 5 between the non-consumable electrode 3 and the workpiece 1;

moving the first arc 5 relative to the workpiece 1 at a controlled rate;

establishing and maintaining a second arc 9 between a consumable electrode 7 preferably made from a wire similar to the metal forming the workpiece 1;

moving the second arc 9 relative to the workpiece 1 at a control rate similar to the rate at which the first arc 5 is moved;

providing a separate source of power for the consumable and non-consumable electrodes 7 and 3;

adjusting one source to produce a straight polarity on the non-consumable electrode 3 so that it has a negative charge, and adjusting the other source so that the consumable electrode 7 has a reverse polarity that is a positive charge on the consumable electrode;

alternately providing an alternating current or AC power supply for the consumable electrode 7;

in some instances, setting the power of the power sources so that the power to the non-consumable electrode 3 is higher than the power of the consumable electrode 7;

placing a baffle 15 between the electrodes 3 and 7 to prevent interference between the arcs 5 and 9 when the electrodes are placed in close proximity to each other generally closer than one and one-half inches;

placing one of the electrodes so that it forms an acute angle with respect to the workpiece.

The method hereinbefore described advantageously extends the utilization of the MIG welding process by adding TIG welding which supplies additional heat locally to the area of the weld to promote tie-in or penetration to the base and side walls of the joint in the workpiece, thus providing the following advantages: improved quality at high disposition rate due to the additional heat; improved production by permitting narrower joint designs which require less filler metal, but greater heat inputs; a substantial reduction or elimination of preheat, which has been necessary to assist in side wall fusion and minimization of cooling rates; and improved productivity and reliability in welding metals, which have high thermal conductivity such as copper and aluminum, which herebefore required high preheat temperatures.

What is claimed is:

1. A method of welding a highly conductive workpiece comprising the steps of:

connecting a power source of straight polarity to a non-consumable electrode and a power source of reverse polarity to a consumable electrode;

producing a first arc between said non-consumable electrode and said highly conductive workpiece, and moving said first arc relative to said highly conductive workpiece at a generally uniform rate;

producing a second arc between said consumable electrode and said highly conductive workpiece;

positioning said second arc adjacent said first arc and moving said second arc relative to said highly conductive workpiece generally at said generally uniform rate; and blanketing said highly conductive workpiece in the vicinity of said arcs with inert gas to weld said highly conductive workpiece.

2. The method as set forth in claim 1 and further comprising the step of operating said power souces so that said non-consumable electrode is at a higher power input level than said consumable electrodes.

* * * * *